US005877949A

United States Patent [19]

Wolfgram et al.

[11] Patent Number: 5,877,949

[45] Date of Patent: Mar. 2, 1999

[54] DIRECT CAPACITIVE DISCHARGE ELECTRIC FENCE CONTROLLER

[75] Inventors: Kirk W. Wolfgram; Gerald D. Wyatt, both of Rochester, Minn.

[73] Assignee: Waters Instruments, Inc., Rochester, Minn.

[21] Appl. No.: 823,141

[22] Filed: Mar. 25, 1997

[51] Int. Cl.[6] .............................. H02M 7/19; H01T 20/00

[52] U.S. Cl. .............................................. 363/61; 361/232

[58] Field of Search ................................ 363/59, 60, 61, 363/126; 327/530, 536; 307/108, 109, 110; 361/232

[56] References Cited

U.S. PATENT DOCUMENTS

| | | | |
|---|---|---|---|
| 3,440,439 | 4/1969 | Nellis | 307/132 |
| 3,487,232 | 12/1969 | Daniels | 307/132 |
| 3,655,994 | 4/1972 | Macme | 307/132 R |
| 3,655,995 | 4/1972 | Malme | 307/132 |
| 3,803,463 | 4/1974 | Cover | 317/262 |
| 3,868,545 | 2/1975 | Caron | 315/209 |
| 3,873,847 | 3/1975 | Finch et al. | 307/64 |
| 3,900,770 | 8/1975 | Kaufman | 361/156 |
| 3,988,594 | 10/1976 | Low et al. | 307/132 |
| 4,084,218 | 4/1978 | Kenney | 363/18 |
| 4,114,185 | 9/1978 | Gallagher | 361/232 |
| 4,167,036 | 9/1979 | Kenney | 363/61 |
| 4,200,809 | 4/1980 | Madsen | 307/132 |
| 4,242,715 | 12/1980 | Laird | 361/232 |
| 4,310,869 | 1/1982 | Niven | 361/232 |
| 4,337,496 | 6/1982 | Laird | 361/232 |
| 4,394,583 | 7/1983 | Standing | 307/108 |
| 4,396,879 | 8/1983 | Weinreich et al. | 320/1 |
| 4,417,301 | 11/1983 | Newman | 363/129 |
| 4,939,618 | 7/1990 | Fingerson et al. | 361/117 |
| 5,355,834 | 10/1994 | Blazek | 119/51 V |
| 5,381,298 | 1/1995 | Shaw et al. | 361/232 |
| 5,514,919 | 5/1996 | Walley | 307/109 |
| 5,596,281 | 1/1997 | Eriksson | 324/713 |

*Primary Examiner*—Adolf Deneke Berhane
*Attorney, Agent, or Firm*—Fredrikson & Byron, P.A.

[57] ABSTRACT

The present invention provides an electric fence controller for delivering an electrical shock to a load when the load simultaneously contacts a fence terminal and the underlying ground. In one embodiment, the controller comprises an AC power supply and a fence terminal positioned above underlying ground. The controller also contains a voltage step-up circuit coupled to the AC power supply for charging at least one multiplier unit and for producing at the fence terminal a substantially increased DC voltage. The at least one multiplier unit discharges as an electric shock to the load when the load contacts the fence terminal and the underlying ground.

22 Claims, 3 Drawing Sheets

DIRECT CAPACITIVE DISCHARGE ELECTRIC FENCE CONTROLLER

TECHNICAL FIELD

The present invention relates to electric fences, and in particular, to circuits that control the delivery of electrical voltage and current to electric fences.

BACKGROUND OF THE INVENTION

Electric fence controllers are devices that control the delivery of electric voltage and current to wire fences. Electric fences are often used to prevent the passage of animals therethrough and are particularly useful for controlling grazing animals. Of major importance in fence controllers is the ability to deliver an electric charge high enough to repel or contain an animal, yet low enough to operate safely under all conditions.

Present electric fence controllers may be classified into three groups, continuous output, pulsed output, and load-sensing fence controllers. Continuous output fence controllers provide a sinusoidally varying voltage across their output terminals. Under certain safety standards, fence controllers are considered unsafe if they deliver an electrical output having too long an on-time, too short an off-time, or too high a root-mean-square (RMS) current per pulse. Continuous output fence controllers, by definition, have a zero off-time and an indefinite on-time and, therefore, do not satisfy such safety standards. An animal or human that touches a continuously electrified fence may not be able to let go or get away from the fence, raising the possibility of delivering an unsafe shock.

The second general class of fence controllers are pulsed output controllers. U.S. Pat. No. 4,114,185, issued Sep. 12, 1978 to Gallagher, discloses such a pulsed output controller. Such pulse controllers periodically deliver a high voltage pulse to the fence. Their periodic rate is often set to conform to off-time requirements of various safety standards. Thus, pulse controllers operate more safely than do continuous output controllers.

Unfortunately, pulsed output fence controllers do not always operate effectively. For instance, during the pulse controller's off-time, an animal can slip through the fence without receiving a shock.

In an attempt to overcome this disadvantage, a third general type of controller senses and discharges when the fence load increases considerably, such as when an animal contacts the fence. When the load remains in contact with the fence, though, this supposedly improved "load-sensing" controller operates as a pulse type controller, pulsing periodically and therefore, less effectively.

Besides possible ineffective operation, another disadvantage shared by pulsed output and load-sensing fence controllers is their generation of electromagnetic noise or interference. Both types of fence controllers deliver a high voltage pulse at their output. The high frequency portions of these pulses radiate from the fence as electromagnetic energy. The resulting electromagnetic energy can interfere with nearby radio communication and other electromagnetic transmission.

In addition to reduced safety and effectiveness and generation of electromagnetic interference, another disadvantage of existing electric fence controllers is their requirement of a ground terminal. To produce a shock, fence controllers require an animal to simultaneously touch (either directly or indirectly) a hot terminal and a ground terminal. The hot terminal or fence terminal is connected to a fence wire while the ground terminal is connected to a separate ground rod embedded in the earth. Even without a ground rod connection, however, existing fence controllers can deliver a shock to an animal contacting the hot fence wire by using the animal as the path to ground. Without an adequate ground, though, the animal may not receive a shock at all, or, if a shock is delivered, a high pulse current will be returned through the neutral of the AC power supply, likely damaging the fence controller and blowing its fuses. To operate at optimum safety, existing fence controllers therefore must be coupled to ground by installing a separate ground rod and connecting it to the fence controller's ground terminal.

Current fence controllers generally require the use of step-up transformers to produce a high-voltage output. Such transformers increase the weight, cost and labor needed to produce the fence controller.

SUMMARY OF THE INVENTION

The invention provides a constant DC source to a fence wire by means of an electric fence controller for delivering a shock to a load (e.g., an animal) when the load contacts a fence wire, deterring the load from passing through the fence. In one embodiment, the entire fence controller is transformerless and has at least one input resistor for receiving an AC voltage from an AC power supply. The input resistor is connected to a voltage multiplier circuit that contains a series of capacitors. The capacitors are successively charged by the AC voltage. When charged, the capacitors collectively produce a DC voltage at a single output of the voltage multiplier circuit. The amplitude of the DC voltage pulse produced is substantially higher than the AC voltage level supplied to the fence controller. An output resistor is connected between the sole output of the voltage multiplier circuit and the fence. When the load contacts the fence wire and the underlying ground, the successively charged capacitors discharge into the load as an electric shock.

The fence controller may also include an output capacitor connected between the fence wire and the underlying ground. The additional charge collected by the output capacitor provides a greater shock to the load when the circuit is discharged. Alternatively, the fence controller may be operated even without a ground connection by referencing the fence controller to the neutral or the ground of the AC power supply.

The fence controller may also include at least a second input resistor connected between the AC power supply's neutral or ground conductor and the voltage multiplier circuit. The input resistor provides a return path for the AC input voltage to charge the voltage multiplier circuit.

In another embodiment, the fence controller may include one or more capacitor and diode pairs to convert the AC voltage it receives into a substantially increased constant DC voltage that is delivered as an electric shock when a load contacts the fence controller's single output and the underlying ground.

In yet another embodiment, the fence controller may also include a transformer to provide a stepped-up AC voltage to the fence controller's capacitive voltage multiplier circuit.

DETAILED DESCRIPTION OF THE INVENTION

Figure 1:
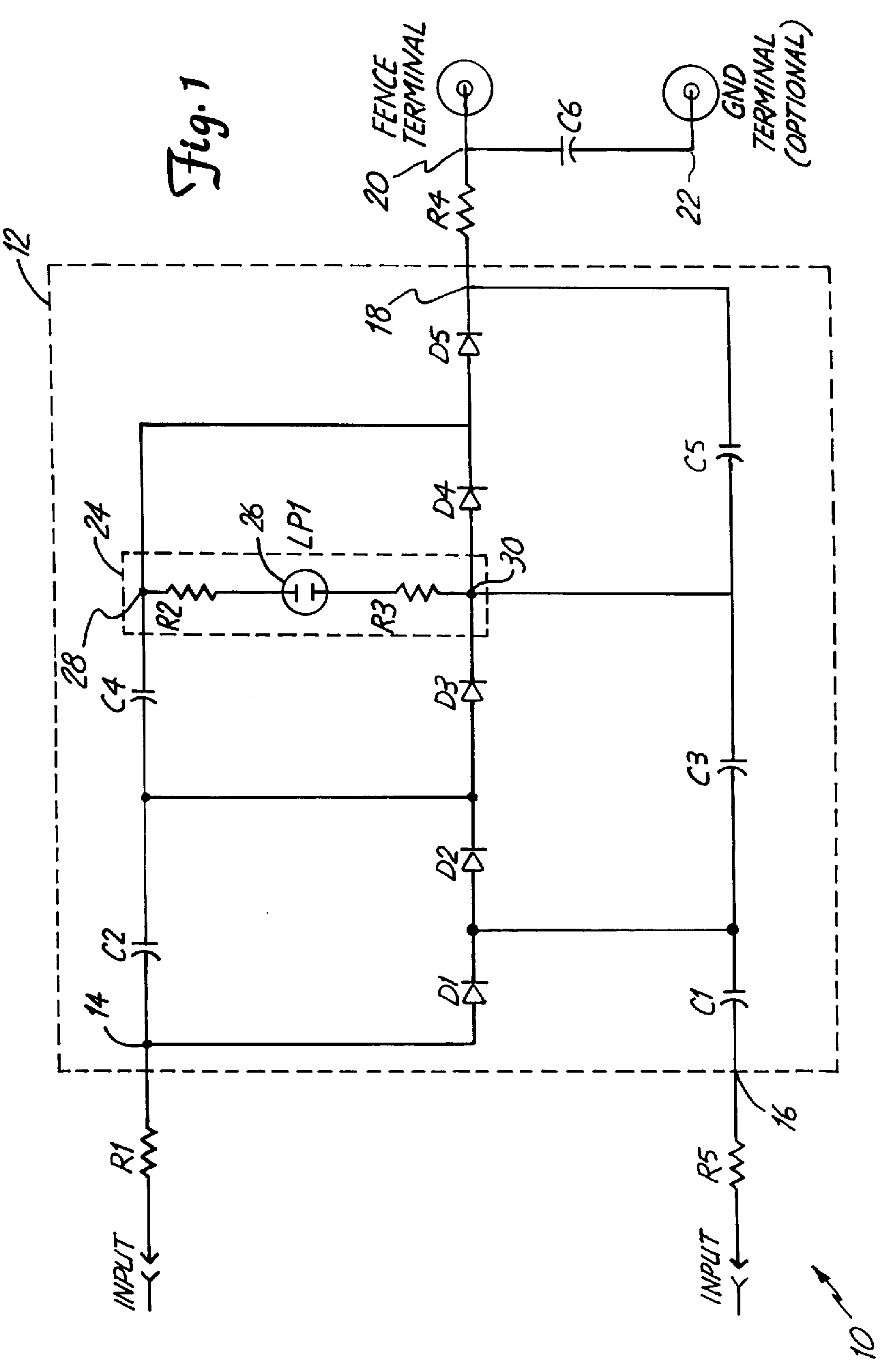
FIG. 1 is circuit schematic diagram of a preferred embodiment of a fence controller of the invention.
Figure 2:
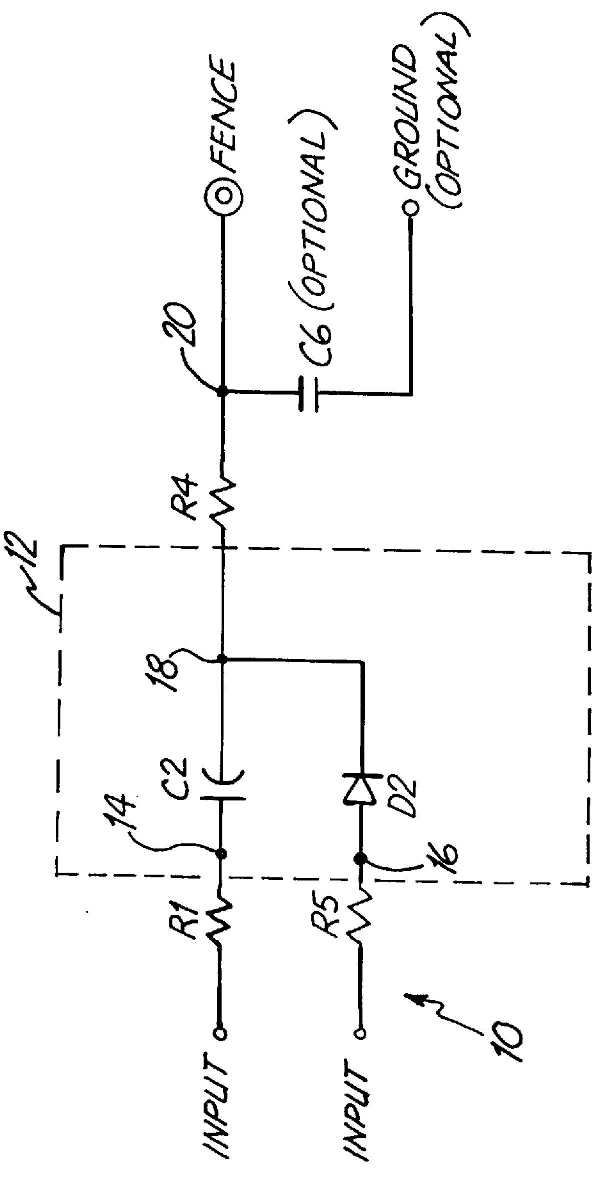
FIG. 2 is a circuit schematic diagram of alternative embodiment of a fence controller of the invention.
Figure 3:
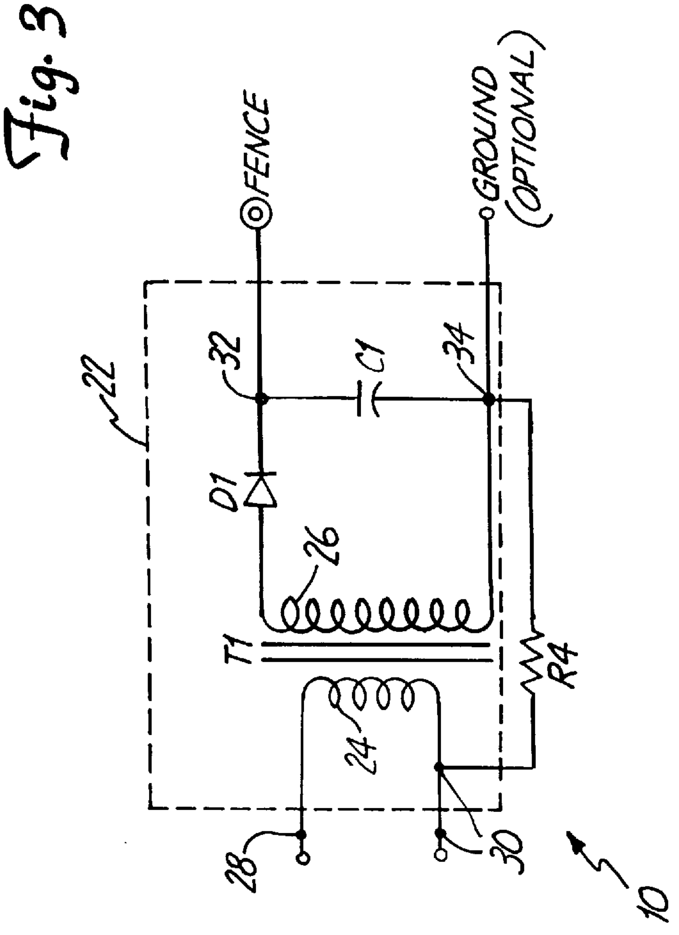
FIG. 3 is a circuit schematic diagram of yet another embodiment of a fence controller of the invention.

FIGS. 1–3 show circuit schematics of a preferred embodiment of the electric fence controller 10 of the invention. In FIG. 1, a suitable AC supply, such as a 105–125 VAC, 50/60 Hz supply, is connected to input resistor R1. The AC supply's neutral conductor or, optionally, its ground conductor, is connected to input resistor R5. The orientation of the AC supply leads is interchangeable. Thus, the fence controller operates equivalently if the AC supply leads are mistakenly reversed, and R5 is connected to the supply and R1 is connected to neutral. The input resistor values are selected to limit the current supply to the fence controller to an acceptable level. Certain safety standards (e.g., Underwriter Laboratories' UL69 standards) require that fence controllers be provided with over-current protection of a 1 Ampere fuse or its equivalent. In the embodiment shown in FIG. 1, R1 and R5 resistor values may be set at about 150 ohms to limit current to no more than 1 Ampere. In addition to improving safety, restricting the current to less than 1 Ampere slows the rate at which the fence controller recharges. A slower rate of charge, in turn, reduces the heat in the fence controller capacitors, thereby requiring less need for heat dissipation.

The outputs of input resistors R1 and R5 are connected to a transformerless capacitive voltage multiplier circuit 12 at input terminals 14 and 16, respectively.

The voltage mulitplier circuit of FIG. 20 includes a plurality of successively charging capacitors C2 and C4 connected in a series circuit including diode D5 between input terminal 14 and sole output terminal 18. Across each of the charging capacitors C2 and C4, there are two series connected diodes, designated D1, D2, and D3, D4, respectively, which rectify the oscillating voltage applied to charge the capacitors C2 and C4. D5 is connected in series with D4, so that between input terminal 14 and sole output terminal 18 there are connected in series 5 diodes, designated D1 through D5. A second plurality of successively charging capacitors C1, C3 and C5 are connected in a series circuit between input terminal 16 and sole output terminal 18. The two series connected diodes D2 and D3 rectify the oscillating voltage applied to charge the capacitor C3 and the two series connected diodes D4 and D5 rectify the oscillating voltage applied to charge the capacitor C5.

The voltage multiplier circuit 12 of the invention desirably includes a plurality of multiplier elements or stages, each of which includes one diode and one capacitor. The number of multiplier elements and the capacitance of the capacitors used will determine the voltage, current and peak energy ultimately delivered by the system.

The voltage multiplier circuit 12 shown in FIG. 1 is a five-stage voltage multiplier, i.e. it includes five multiplier stages. Each multiplier stage comprises one of the five capacitors C1–C5 and one of the five diodes D1–D5. In particular, C1 and D1 can be considered one multiplier stage, C2 and D2 can be considered a second stage, C3 and D3 may comprise a third stage, C4 and D4 can be considered a fourth stage, while C5 and D5 can be viewed as a fifth stage.

The purpose of the voltage multiplier circuit 12 is to convert the oscillating voltage received from the AC power supply into a substantially increased DC voltage that is provided as a pulse or shock to an animal that contacts the fence. It is believed that the minimum voltage needed to deliver an effective shock to short-haired animals is 700 VDC.

The DC output produced by the multiplier circuit varies linearly with the number of its stages. A single-stage multiplier develops a substantially DC output that is approximately double the peak input voltage. In theory, a five-stage multiplier circuit, like that shown in FIG. 1, will increase the voltage five times the peak input voltage to produce a substantially DC voltage approximately six times the input; in practice, the total voltage is usually slightly less. Voltage multiplier circuit 12 therefore develops approximately 1000 VDC with a standard 110 volt (RMS) 60 Hz AC input, which has a peak input voltage of about 155 volts. It is believed that this level is high enough to deliver an effective shock to short-haired animals.

FIG. 2 shows a circuit schematic of another preferred embodiment of the electric fence controller 10 of the invention. The voltage multiplier circuit 12 shown in FIG. 2 is only a single-stage circuit where capacitor C2 and diode D2 comprise the single multiplier element. The electric fence controller 10 shown in FIG. 2 will develop a substantially DC output that is approximately double its peak input voltage.

The current and peak energy delivered to the fence are determined by the capacitor values. The value of C1, the first capacitor in the voltage multiplier circuit 12, has the largest effect on increasing the power delivered at the sole output terminal 18. The farther in the circuit from the AC supply, the less the capacitor's value affects the output.

The peak discharge energy of the voltage multiplier circuit 12 is limited by its smallest capacitor. Setting all the capacitor values to be equal creates the optimum design. However, other arrangements would still yield the benefits of the invention.

In the embodiment of FIG. 1, the capacitance values of capacitors C1 through C5 are desirably set to 0.15 microfarads. Besides determining the peak energy delivered at the sole output terminal 18, capacitors C1 through C5 also help maintain a lower after-shock current, that is, the current delivered after the substantially increased DC voltage stored in the voltage multiplier 12 is delivered as an electric shock to the animal or other load. Should all but one of the capacitors C1 through C5 fail, setting capacitors C1 through C5 to 0.15 microfarads limits the after-shock current to a level that conforms to certain safety standards.

In the embodiment shown in FIG. 1, an output resistor R4 may be connected between the sole output terminal 18 and a fence terminal or fence wire 20. Resistor R4 limits the current to the fence wire 20 and helps maintain a lower after-shock current. Like capacitors C1 through C5, resistor R4 has the added benefit in that it limits the current delivered to the fence wire 20 should any component within the fence controller 10 fail.

It is believed that a resistor R4 having a resistance of about 27,000 ohms should be sufficient to limit the after-shock current to less than five milliamps. Certain safety standards consider a fence controller "off" when it conducts less than 5 milliamps of current. Thus, the resistor R4 ensures that any after-shock current flowing through the fence controller 10 is delivered at such a low level that it will not prevent an animal from disengaging itself from the fence wire 20 after the initial shock is delivered.

To further enhance the current and peak discharge energy delivered to the load contacting the fence, an additional capacitor C6 may optionally be connected from the fence wire 20 to ground. With a capacitor C6 of 0.1 microfarads connected as shown, the fence controller will deliver added energy and current to output terminal 18 without a change in DC output voltage and without exceeding limits established by certain safety agencies. Other capacitance values for capacitor C6 may be used.

Unlike existing fence charging systems, the ground connection in the present invention is entirely optional. Elimination of the ground connection will not disrupt fence controller 10 operation. If the ground connection is eliminated, the animal or other load need not contact a separate ground terminal to receive a shock. The fence controller 10 is directly connected, and thereby referenced, to the neutral of the AC power supply. The fence controller will deliver a shock when the load contacts fence wire 20, which is connected to the single or sole output terminal 18, so long as the load is contacting the underlying ground.

When operated without a separate ground terminal other prior art systems return high pulse currents through the AC neutral connection that may damage the AC supply. The present invention, however, operates without a ground connection. Resistor R4 and the components of the voltage multiplier circuit 12 provide substantial impedance protection for the AC supply's neutral. They limit the return current through the neutral of the AC supply to less than 70 milliamps.

The fence controller may also be equipped with a lamp circuit 24 that illuminates when the voltage multiplier circuit 12 is charged. The lamp circuit is provided by resistor R2, neon lamp 26 and resistor R3, all connected in series. The lamp circuit 24 is coupled within the voltage multiplier circuit 12 by connecting R2 at terminal 28 located between C2, D4 and D5, and connecting R3 at terminal 30 located between D3 and D4. In the embodiment of FIG. 1, R2 and R3 are both 270,000 ohm resistors.

In operation, as the AC supply swings positive across R1 to about 0.6 VDC, D1 begins to conduct allowing current flow through C1 to the AC supply neutral, thereby charging C1. The voltage this develops across C1, in combination with the negative voltage from the AC supply's negative half-cycle, reverse bias D1, which blocks D1 from conducting during ensuing negative half-cycles, and causes D2 to conduct through C2 to the AC supply, thereby charging C2. The voltage this develops across C2 blocks D2 from conducting during ensuing positive half-cycles. These positive half-cycles cause D3 and D1 to conduct through both C3 and C1 to the AC neutral. Eventually, during positive half-cycles of the AC supply, D2 and D4 block current and D1, D3 and D5 all conduct current through C1, C3 and C5 to the AC neutral, thereby charging C1, C3 and C5. During negative half-cycles of the AC supply, D1, D3 and D5 block current and D2 and D4 conduct current through C4 and C2 to the AC supply, thereby charging C4 and C2.

As charge builds on capacitors C1 through C5, the voltage across lamp circuit 24 increases to the point where the neon lamp 26 in the lamp circuit 24 breaks down and begins to glow, thereby providing a visual indication that the voltage multiplier circuit 12 is charged. If the optional charging capacitor C6 is connected at the fence terminal, the AC supply voltage charges C6 after capacitors C1 through C5 are charged.

The charge introduced in capacitors C1 through C6 is cumulative at the fence wire 20. When an animal or some other load contacts the fence wire and the underlying ground, the capacitors in the fence controller 10 immediately discharge into the load, providing an electric pulse or shock to the load. After the animal or load disengages from the fence wire 20, the charging process starts over.

The fence controller 10 offers several advantages besides those already mentioned. Since the fence controller 10 may be transformerless, it costs less to produce. Instead of using a transformer, the high voltage needed to produce a shock is developed through the capacitive voltage multiplier network 12. A transformer is not needed to isolate the AC supply from the fence wire 20. Instead, resistors R1, R4, and R5, which are connected directly to the AC supply, provide over-current, impedance protection.

The fence controller 10 need not be transformerless, however. FIG. 3 shows a circuit schematic of an alternative, though somewhat less preferred, embodiment of an electric fence controller 10 of the invention. The voltage multiplier circuit 22 shown in FIG. 3 includes a transformer T1 having primary winding 24 and secondary winding 26. The primary winding connects to the AC supply's hot and neutral conductors at terminals 28 and 30, respectively. Diode D1 is connected between one side of the secondary winding 26 and the fence terminal at output terminal 32. Capacitor C1 is connected between output terminal 32 and the other side of secondary winding 26 at terminal 34. Terminal 34 may optionally be connected to ground. Resistor R4 is connected between terminals 34 and 30.

The embodiment of the fence controller 10 shown in FIG. 3 operates much like the previous two embodiments. Transformer T1 steps-up the voltage received from the AC supply. Diode D1 and capacitor C1 comprise a single multiplier stage for converting the oscillating voltage received from the secondary winding 26 into an increased DC voltage that is provided as a pulse or shock to an animal that contacts the fence terminal 32.

Like previous embodiments, the fence controller 10 in FIG. 3 is current-limiting. Transformer T1 is desirably designed to limit the current available from its secondary winding. One suitable transformer is manufactured by Hol-Dem and sold as Model No. 51. In addition to transformer T1, resistor R4 also limits the current delivered to a load after the shock is delivered or if any component within the fence controller 10 fails. Resistor R4 also allows the fence controller 10 to operate without using a separate ground terminal. The fence terminal 32 is directly connected, and thereby referenced, to the neutral of the AC power supply through resistor R4. The fence controller 10 will deliver a shock when the load contacts fence terminal 32 so long as the load is contacting the underlying ground. Similar to the other embodiments, R4 also provides substantial impedance protection to limit the return current through the neutral of the AC power supply.

Unlike pulse-type and load-sensing fence controllers, fence controller 10, as shown in FIGS. 1–3, generates very little electromagnetic interference. In general, fence controllers radiate electromagnetic energy as they discharge. Unlike past fence controllers which continuously or periodically discharge, the fence controller 10 only discharges when it comes in contact with a load. The fence controller 10 therefore seldomly produces any interference.

Besides producing little interference, other advantages are realized by the fence controller 10 only discharging when a load contacts it. First, the fence controller 10 provides suitable on-times and off-times to meet the requirements of even fairly stringent safety standards. Even so, unlike pulse type fence controllers, the fence controller 10 has no significant off-time during which an animal can touch the fence wire 20, and perhaps slip through the fence, without receiving a shock. Instead, the animal immediately receives a shock when it touches the fence wire 20.

While several preferred embodiments of the present invention have been described, it should be understood that various changes, adaptations and modifications may be made therein without departing from the spirit of the invention and the scope of the appended claims.

What is claimed is:

1. An electric fence controller comprising:

an AC power supply providing an AC voltage;

a fence terminal positioned above underlying ground; and a voltage step-up circuit including a plurality of resistors and at least one multiplier element comprising a capacitor and diode pair, the voltage step-up circuit being coupled to the AC power supply for receiving the AC voltage to charge the at least one multiplier element and produce at the fence terminal a substantially increased constant DC voltage, the at least one multiplier element discharging to deliver the substantially increased DC voltage as an electric shock to a load when the load contacts the fence terminal and the underlying ground.

2. The electric fence controller of claim 1 wherein the voltage step-up circuit is coupled to a neutral conductor of the AC power supply to reference the fence terminal to the neutral conductor of the AC power supply.

3. The fence controller of claim 2, wherein the neutral conductor of the AC power supply receives a maximum pulse current of 70 milliamps.

4. The electric fence controller of claim 1 wherein the voltage step-up circuit is coupled to a ground conductor of the AC power supply to reference the fence terminal to the ground conductor of the AC power supply.

5. The electric fence controller of claim 1 wherein the voltage step-up circuit further comprises a transformer with primary and secondary windings.

6. The electric fence controller of claim 4 further comprising a resistor connected between the primary and secondary windings of the transformer.

7. The electric fence controller of claim 1 wherein the voltage step-up circuit is transformerless.

8. The fence controller of claim 1 wherein the voltage step-up circuit comprises five multiplier elements connected as a five stage step-up circuit.

9. The fence controller of claim 1, wherein the substantially increased constant DC voltage is at least 900 volts.

10. A transformerless electric fence controller comprising:

an input resistor adapted to receive an oscillating voltage from an AC power supply;

a transformerless voltage step-up circuit having an input terminal, a sole output terminal and at least one multiplier element comprising a diode and capacitor pair coupled between the input terminal and the output terminal, the input terminal being coupled to the input resistor to charge the multiplier element by the oscillating voltage received at the input terminal and produce at the sole output terminal a substantially increased constant DC voltage;

an output resistor coupled to the sole output terminal of the voltage step-up circuit; and a fence terminal coupled to the output resistor, the at least one multiplier element discharging to deliver the substantially increased DC voltage as an electric shock to a load when the load contacts the fence terminal and the underlying ground.

11. The transformerless electric fence controller of claim 10 wherein the voltage step-up circuit is coupled to a neutral conductor of the AC power supply to reference the fence terminal to the neutral conductor of the AC power supply.

12. The transformerless electric fence controller of claim 10 wherein the voltage step-up circuit is coupled to a ground conductor of the AC power supply to reference the fence terminal to the ground conductor of the AC power supply.

13. The transformerless fence controller of claim 10, wherein the voltage step-up circuit comprises at least two multiplier elements connected as stages.

14. The transformerless fence controller of claim 13 wherein the capacitors in the at least two multiplier elements charge consecutively from the input terminal to the sole output terminal.

15. The transformerless fence controller of claim 14 wherein the value of the capacitors in the at least two multiplier elements is about 0.15 microfarads.

16. The transformerless fence controller of claim 10, further comprising a lamp circuit having a neon lamp and connected across the voltage step-up circuit, the lamp illuminating when the at least one multiplier element has charged.

17. The transformerless fence controller of claim 10, wherein the voltage step-up circuit further comprises a second input terminal.

18. The transformerless fence controller of claim 17, further comprising a second input resistor coupled between a neutral conductor of the AC power supply and the second input terminal to reference the fence terminal to the neutral conductor of the AC power supply.

19. The transformerless fence controller of claim 10, wherein the value of input resistor is substantially 150 ohms, and the root-mean-square value of the oscillating voltage is 120 volts, thereby limiting a current supplied by the AC power supply that charges the at least one multiplier element to less than 1 Ampere.

20. The transformerless fence controller of claim 10, wherein the value of the output resistor is substantially 27,000 Ohms, and the root-mean-square value of the oscillating voltage is 120 volts, thereby limiting a current supplied by the AC power supply to less than 5 milliamps when the fence terminal is contacted by a load contacting the underlying ground after the substantially increased DC voltage is delivered as an electric shock to the load.

21. The transformerless fence controller of claim 10, further comprising an output capacitor coupled between the fence terminal and the underlying ground and charged by the voltage step-up circuit, the output capacitor discharging to deliver an enhanced electric shock to the load when the load contacts the fence terminal and the underlying ground.

22. The transformerless fence controller of claim 10 wherein the fence terminal is coupled to a wire fence.

* * * * *